July 15, 1952     F. D. BRADDON     2,603,003
GYROSCOPIC INSTRUMENT
Filed July 21, 1947     4 Sheets-Sheet 1

INVENTOR
FREDERICK D. BRADDON
BY
Herbert H. Thompson
his ATTORNEY

July 15, 1952  F. D. BRADDON  2,603,003
GYROSCOPIC INSTRUMENT
Filed July 21, 1947  4 Sheets-Sheet 2
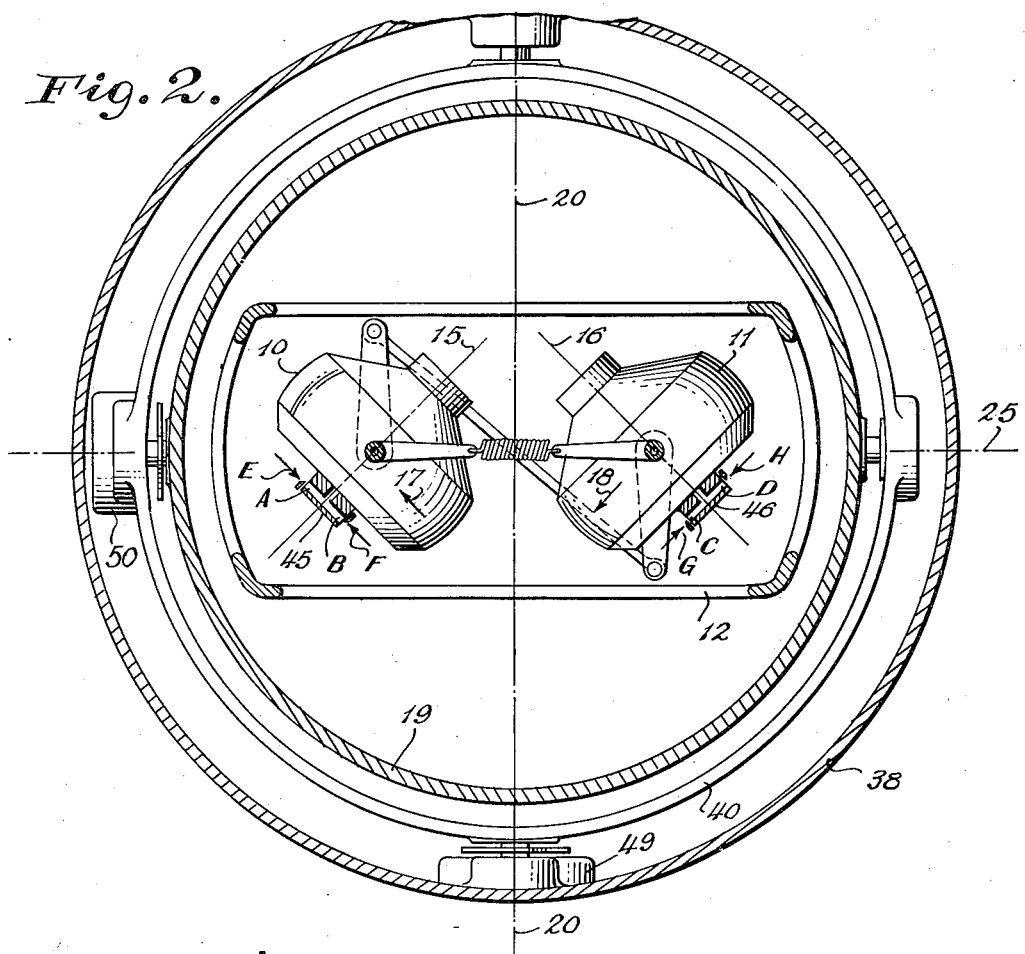
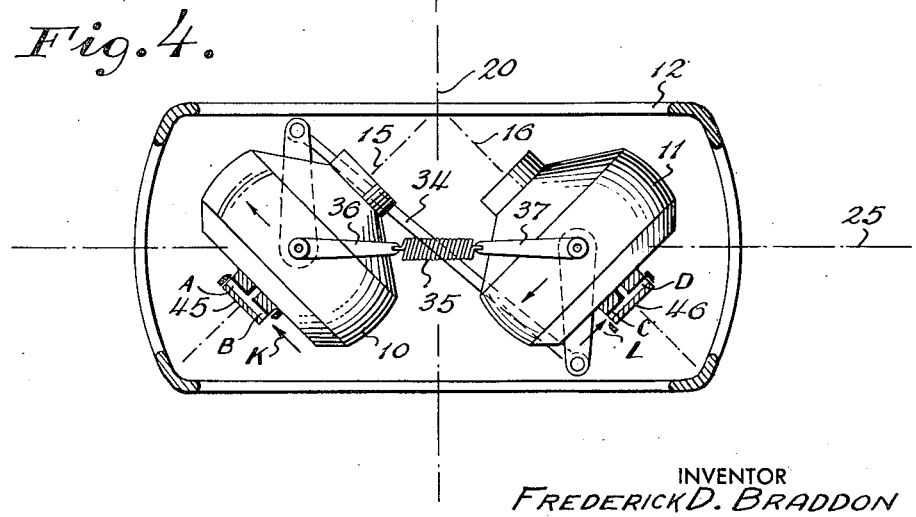
INVENTOR
FREDERICK D. BRADDON
BY Herbert H. Thompson
his ATTORNEY.

July 15, 1952 F. D. BRADDON 2,603,003
GYROSCOPIC INSTRUMENT
Filed July 21, 1947 4 Sheets-Sheet 3

INVENTOR
F. D. BRADDON
BY
Herbert V. Thompson
his ATTORNEY.

July 15, 1952

F. D. BRADDON 2,603,003

GYROSCOPIC INSTRUMENT

Filed July 21, 1947

INVENTOR
FREDERICK D. BRADDON
BY
*Herbert H. Thompson*
his ATTORNEY.

Patented July 15, 1952

2,603,003

UNITED STATES PATENT OFFICE 2,603,003

GYROSCOPIC INSTRUMENT

Frederick D. Braddon, Babylon, N. Y., assignor to The Sperry Corporation, a corporation of Delaware Application July 21, 1947, Serial No. 762,293

12 Claims. (Cl. 33—222)

This invention relates to a gyroscopic instrument that provides a vertical reference about both horizontal axes and preferably also an azimuthal reference. The improved instrument utilizes a gyroscopic arrangement similar to that employed in a gyro compass of the Anschutz type in which oppositely connected twin gyro rotor frames are mounted in a sensitive element with freedom about respective vertical axes. The normally horizontal spin axes of the rotors of such frames are further situated in angular relation to one another in this arrangement. As shown in the art in Patent No. 1,186,339 to Schuler and Patent No. 1,895,628 to Anschutz-Kaempfe, the Anschutz gyro compass instruments provide an azimuth baseline only.

An object of the present invention is to control the rotor frames of an instrument of this character by gravity reference and torque exerting means to maintain the spin axes of the rotors in a vertical reference defining horizontal plane.

Another object is the provision of an azimuthally stabilized vertical reference device which may be readily adapted to seek the meridian as either a true gyroscopic compass or as a magnetically slaved gyroscopic compass.

In accordance with the invention, each of the rotor frames of the improved instrument includes a gravity reference for detecting tilt of the spin axis of the rotors from a horizontal plane and further includes means responsive to the reference for applying torques about the vertical axes of freedom of the frames.

The gyroscopic instrument of my invention being stabilized about the vertical axis also provides a stable reference in azimuth, which, however, possesses no meridian seeking properties and is therefore not a true azimuthal reference in the ordinary sense. However, my instrument may readily incorporate an additional gravitational control which renders it a true gyro-compass or azimuthal reference. Instruments that provide azimuthal as well as vertical references are known in the art as zenith meridian indicators. Such an instrument is shown and described in my copending application with Victor Vacquier, Serial No. 658,902, filed April 2, 1946 for a gyroscopic reference instrument. Moreover, my instrument may readily be controlled by or slaved to a magnetic reference device such as a flux valve which effectively renders said instrument a magnetically slaved gyroscopic compass or as it is often called, a gyro magnetic compass.

Other features and structural details of the invention will be apparent from the following description, when read in relation to the accompanying drawings, wherein:

Fig. 2 is a plan view of the instrument shown in Fig. 1;

Fig. 4 is a view similar to Fig. 3 showing the positions of the gravity reference means with tilt of the element about the other of its horizontal axes of support;

Figure 1:
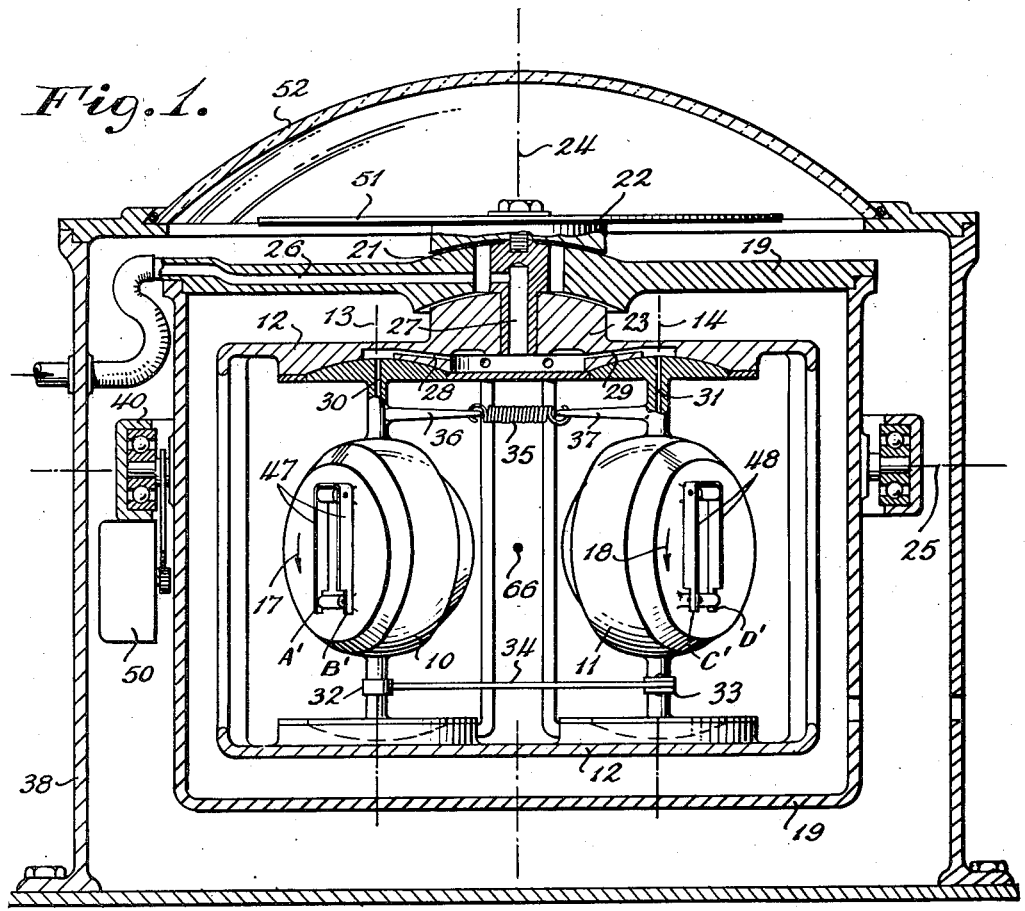
Fig. 1 is an elevation view, partly in section, of an instrument embodying the present inventive concepts.

With reference to Figs. 1 and 2, the gyroscopic instrument shown is a vertical reference providing type that includes twin gyro rotor frames 10, 11 that are mounted with freedom on the sensitive element or platform 12 of the instrument to precess about parallel vertical axes 13, 14 respectively. The respective rotor frames 10, 11 contain rotors (not shown) mounted to spin about the normally horizontal axes 15 and 16, Fig. 2 in the directions indicated by the arrows 17 and 18. As shown, each of the axes 15 and 16 are disposed at an angle of approximately 45° with respect to a horizontal line representing one of the horizontal axes of support of element 12 as indicated at 20. The frames 10, 11 have rotors that spin about normally horizontal axes 15, 16 arranged in angular relation to one another.

The sensitive element or platform 12 is supported with freedom about a vertical axis 24 in a casing or housing 19 by means such as an air bearing having a top convex and bottom concave spherical portion 21 integral with the housing 19 and two spaced, respectively, concave and convex spherical cups 22 and 23 that form a portion of the sensitive element 12. Axis 24 provides the azimuthal axis of the platform or sensitive element 12 of the instrument. The bearings supporting the rotor frames 10 and 11 of the instrument may also be of the air type, as shown, so that air can be supplied to the respective frames to drive the rotors therein by way of ducts 27, 28, 29, 30 and 31. The described air bearing provides three degrees of freedom between the element 12 and the housing or casing 19. To provide a nonpendulous sensitive element, the effective center of curvature 66 of the air bearing corresponds with the position of the center of gravity of the element 12.

The two gyro rotor frames are oppositely connected by means of arms 32, 33 attached respectively to frames 10, 11 and link 34 which is pivotally connected to the ends of the respective arms. The rotor frames are thus constrained to precess equally and oppositely about their vertical axes 13 and 14. As shown, the frames 10 and 11 are also connected by means of spring 35 between arms 36 and 37. Spring 35 functions to maintain the positions of the rotor frames 10 and 11 with the desired angular relation between the spin axes 15, 16 and the horizontal axis 20 of the sensitive element 12.

Housing or casing 19 of the instrument is universally supported in a binnacle 38 that is fixedly mounted on the craft or ship on which the instrument is used. As shown, this support includes a gimbal ring 40 whose horizontal axis in Fig. 2 corresponds with axis 20 of the element 12. The minor horizontal axis 25 of housing or casing 19 in the binnacle is normal to its major axis as defined by the axis 20. The platform or sensitive element is universally supported with freedom relative to the binnacle about the mutually perpendicular, normally horizontal axes 20 and 25.

In accordance with the present invention, means are provided for applying torques about the axes 13, 14 of the frames. As shown, such means take the form of air blast means including a T-shaped vent carried by each of the frames. The vents for the respective frames 10, 11 are indicated at 45 and 46. Vent 45 is provided with oppositely directed horizontal ports A and B for exhausting air from the enclosed frame 10. Vent 46 on frame 11 includes a pair of similar ports C and D which exhaust air from the enclosed frame 11 in a horizontal direction normal to the spin axis 16. Vents A, B, C and D are normally half covered as shown in Figs. 1 and 2, by gravity reference means in the form of pendulous vanes A', B', C' and D' so that when the platform or sensitive element is free of tilt about both axis 20 and axis 25, the torque applying means provides normally balanced forces represented by arrows E, F, G, and H about the respective vertical axes 13 and 14 of the rotor frames 10 and 11 and about the vertical or azimuthal axis 24 of the sensitive element. These forces are caused by the reaction of the escaping air, in this instance, and are therefore opposite to the direction of the air flow. Vanes A', B' and C', D', form respective parts of gravity reference pendulums 47 and 48 that are mounted on the respective frames 10 and 11. Pendulums 47 pivot about an axis on frame 10 that is normal to the spin axis 15, the same operating to detect tilt of axis 15 from a horizontal plane and control ports A and B. Likewise, pendulums 48 pivot about an axis on frame 11 that is normal to spin axis 16. The torque applying means on frame 11 operates in response to the pendulums 48 when the same detect tilt of spin axis 16 from a horizontal plane.

Figure 3:
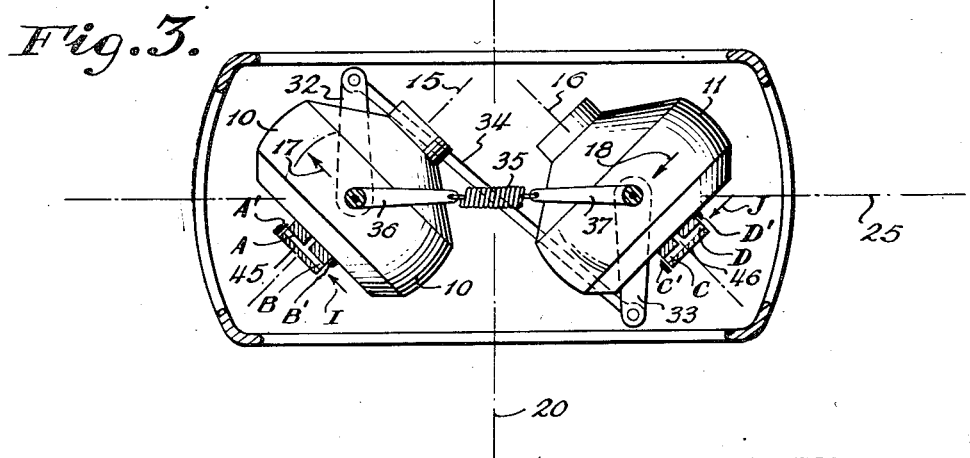
Fig. 3 is a detail plan view of the platform or sensitive element of the instrument showing the positions of the gravity reference means with tilt of the element about one of its horizontal axes of support.

With tilt of the platform or sensitive element 12 about axis 25, with the top end of the element as viewed in Fig. 2 deflected downwardly, the pendulums 47 and 48 assume the positions shown in Fig. 3. With this condition, port A is less than half opened, port B is more than half opened, port C is less than half opened and port D is more than half opened. The torque applying air blast means are consequently unbalanced and the forces represented by arrows I and J being additive provide a resultant levelling torque for the instrument that is effective about the vertical axis 24 of element 12. This torque operates to precess the element 12 to a tilt free condition about the horizontal axis 25. When this condition is reached spin axes 15 and 16 are also horizontal, the pendulums 47 and 48 depend vertically and do not cause unbalance of the respective torque applying means.

Fig. 4 shows the positions of the pendulums 47 and 48 with tilt of the element 12 about axis 20 with the right hand end of element 12 deflected downwardly as viewed in Fig. 2. In this event, port B is more than half opened, port A is less than half opened, port C is more than half opened and port D is less than half opened. The unbalanced torque applying means then provides forces represented by the arrows K and L that are substractive and balanced about the vertical axis 24 of the element. These forces cause opposite levelling torques effective about the respective vertical axes 13 and 14 of the rotor frames 10, 11 and hence act to precess the element to a tilt free condition about axis 20 because of the direction of spin of the rotators. This restores the spin axes 15 and 16 to a horizontal position. Torques are consequently applied about each of the vertical axes 13 and 14 of the frames in the same sense, Fig. 3, with the consequent correction of tilt about one of the horizontal axes, axis 25, and in the opposite sense, Fig. 4, with the consequent correction of tilt about the other of the horizontal axes, axis 20.

The use of air bearings between each of the gyroscope 17, 18 and the supporting frame 12 to give them freedom about their individual vertical axes, has especial advantages in applicant's instrument where individual tilt correcting torques are applied about the vertical axis of each gyro. Air bearings being the most frictionless type of bearings known, prevent the gyroscopes from creeping in the direction of the applied correcting torques.

In the vertical reference type of gyroscopic instrument shown, roll and pitch readings may be taken from a pair of selsyn transmitters indicated generally at 49 and 50 that form a part of the instrument. As the platform 12 is levelled about axes 20 and 25, the instrument may provide the indication of a stabilized directional gyro having a compass card 51 that is movable with movement of the element 12 about its azimuth axis 24. Card 51 may be viewed through a suitable window 52 with a lubber line (not shown) thereon. As shown herein, the window 52 is situated on the top of the binnacle 38.

Figure 8:
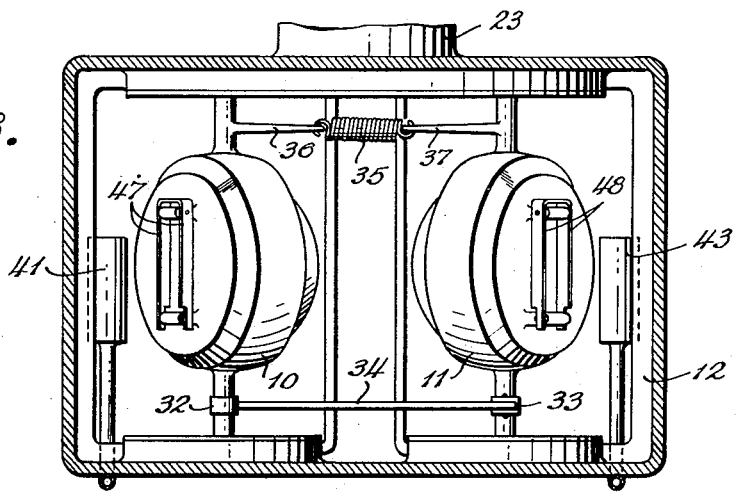
Fig. 8 is a detail elevation view of the sensitive element of a gyroscopic zenith meridian indicating instrument in which liquid ballistic means are included to provide an azimuthal baseline.
Figure 9:
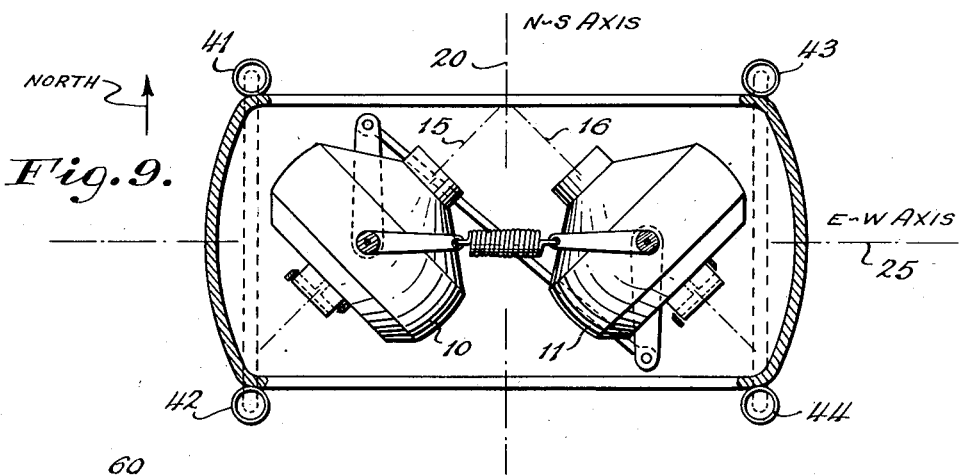
Fig. 9 is a plan view of the element shown in Fig. 8.

As stated above, my instrument is also stabilized about its vertical axis and hence provides, temporarily at least, a base line about this axis. Without additional means, however, this base line does not remain fixed, since it has no reference position. To form an instrument having an azimuth reference, that is, one that also provides a compass or azimuthal reference, a third torque applying means may be included on the element 12 which is effective about the horizontal axis 25 of the instrument and renders it meridian seeking. In the instrument shown in Figs. 8 and 9, sensitve element or platform 12 includes liquid ballistic means thereon in the form of interconnected pairs of liquid containers 41, 42 and 43, 44 of conventional construction in gyro compasses. Such means operates responsive to gravity with a change in the level of the liquid in the containers to cause the sensitive element 12 to precess about axis 24 toward the meridian. The device would then constitute a zenith meridian indicator of the gyroscopic compass type in which the horizontal axis 25 remains East-West and horizontal axis 20 North-South.

Figure 5:
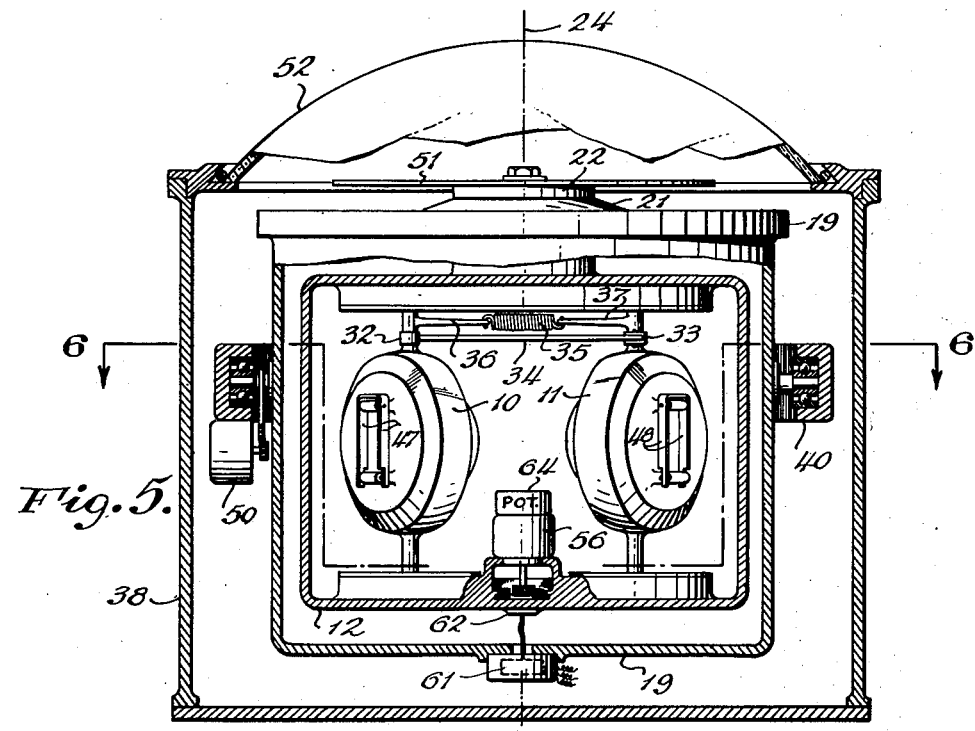
Fig. 5 is a view similar to Fig. 1 showing the invention embodied in a gyroscopic instrument of the zenith meridian indicating type in which the same also provides an azimuthal baseline.
Figure 6:
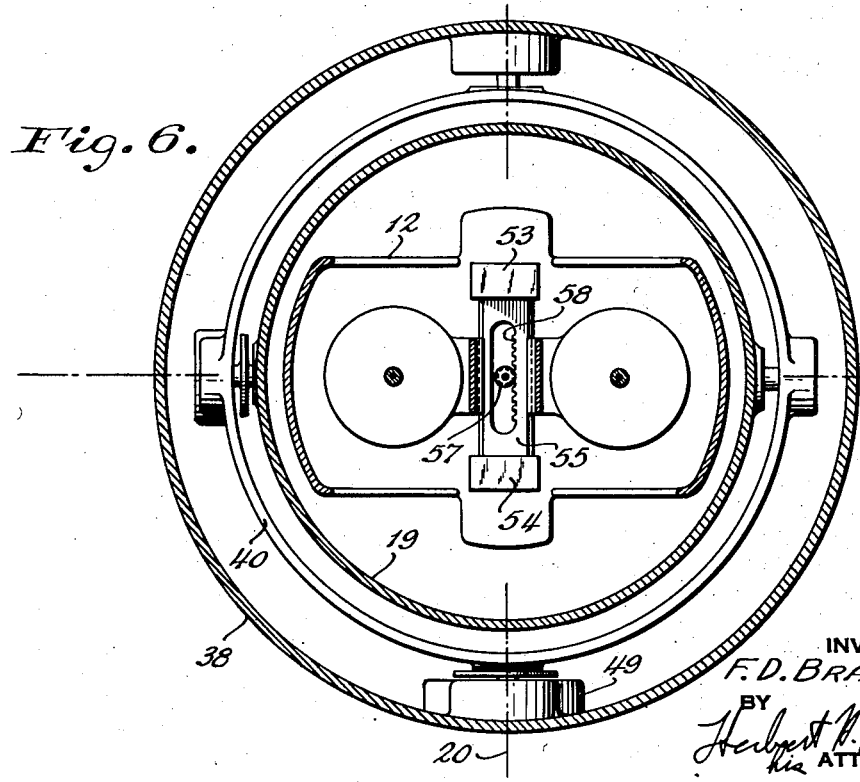
Fig. 6 is a view taken on line 6—6, Fig. 5.
Figure 7:
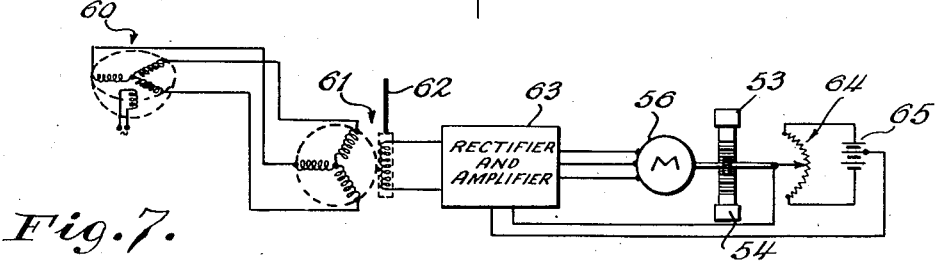
Fig. 7 is a schematic view and wiring diagram of the azimuth control means included in the instrument of Figs. 5 and 6.

Figs. 5, 6 and 7 show a further modification of the instrument as a zenith meridian indicator. In this instance, the torque applying means is provided by a pair of weights 53, 54 on opposite sides of axis 25 that are fixedly mounted on a slide 55 situated at the bottom of element 12. A motor 56 is operatively connected to the slide 55 by way of a gear 57 and rack 58 connection. The weights 53 and 54 are normally in a balanced position in Fig. 6. When the compass is off the meridian the weights 53 and 54 are shifted North or South so that there is a resultant torque about the horizontal East-West axis 25 in a proper direction to maintain the compass on the meridian. In this form of the invention, a magnetic reference device responsive to the earth's magnetic field such as a flux valve 60 or an ordinary magnetic compass having some form of transmitter connected thereto, such as a selsyn may be used to position the sensitive element 12 in azimuth. Such an instrument is known generally in the art as a gyro magnetic compass or "Gyrosyn." Flux valve 60 may be the type of magnetic field responsive device shown in Patent No. 2,383,460, issued August 28, 1945. The outputs of such a valve and a selsyn transmitter are similar. As shown in Fig. 7, flux valve 60 is arranged in a circuit with a receiver 61 of the selsyn type whose stator windings are fixed to the casing 19 and whose rotor winding turns in azimuth with a flexible wire 62, extending from the underside of the element 12. This arrangement produces a null output when the axis 20 of element 12 is in a North-South direction. With departure from this condition the receiver 61 produces an output that actuates the motor 56 through amplifier 63. Wire 62 permits the element 12 to move at the air bearing 21 about either axis 20 or 25 relative to housing 19 through a limited angle.

Motor 56 operates to shift the weights 53 and 54 so that a meridian restoring torque is exerted about axis 25 of the instrument. To assure that motor 56 rotates proportionally to the extent of departure of the device from the meridian, a follow back control may be employed which is shown as a potentiometer 64 in a bridge arrangement with battery 66. The movable arm of the potentiometer 64 moves with displacement of the weights from a central position to unbalance and provide a follow-back input to amplifier 63.

What is claimed is:

1. A gyroscopic instrument comprising a binnacle, a platform mounted on said binnacle for freedom about a normally vertical axis, a pair of rotor frames mounted on said platform for freedom about respective vertical axes, said frames having rotors spinning about normally horizontal axes arranged in angular relation to one another, means for connecting the frames in opposed relation about their respective vertical axes, gravity reference means on each of said rotor frames for detecting tilt of the respective rotor axes from a horizontal plane about a plurality of horizontal axes, and means responsive to the respective gravity reference means for applying torques about the respective vertical axes of the frames so that with tilt about one of the horizontal axes of the platform the torques are in the same direction about the vertical axis of each frame to restore the platform to horizontality about said horizontal axis and with tilt about the other of the horizontal axes of the platform the torques are in opposite directions about each vertical axis of said frames to restore the platform to horizontality about said second horizontal axis.

2. An instrument as claimed in claim 1, including a third torque applying means mounted on said platform and effective about the one of the noted horizontal axes of the platform to precess the platform about its vertical axis.

3. An instrument as claimed in claim 1, including liquid ballistic means mounted on said platform to impart meridian seeking properties to the instrument.

4. An instrument as claimed in claim 1, including means for controlling the platform about its vertical axis comprising a torque exerting means mounted on said platform and effective about the one of the noted axes of the platform, a magnetic reference device responsive to the earth's magnetic field, and slaving means interconnecting said device and torque exerting means whereby the instrument operates as a stabilized gyro magnetic compass.

5. In a gyroscopic instrument, a sensitive element mounted with freedom about two, mutually perpendicular, normally horizontal axes and about a normally vertical axis, a pair of interconnected rotor frames mounted on said element to move about vertical axes and having rotors thereon spinning about normally horizontal axes arranged in angular relation to one another, gravity reference means on each frame for detecting tilt of the spin axis of the respective rotors from a horizontal plane, and torque applying means respectively responsive to said reference means operable about each of the respective vertical axes of the frames in the same sense with tilt about one of the horizontal axes and in the opposite sense with tilt about the other of the horizontal axes.

6. An instrument as claimed in claim 5, which includes a third torque applying means mounted on said element and effective about the one of the noted axes of the element to precess the element about its vertical axis.

7. An instrument as claimed in claim 5 which includes a third torque applying means mounted on said element and effective about the one of the noted axes of the element to precess the element about its vertical axis, and which further includes a magnetic reference device responsive to the earth's magnetic field, and slaving means interconnecting said device and the third torque applying means whereby the instrument operates as a stabilized gyro magnetic compass.

8. In a gyroscopic instrument having a main support, a pair of gyroscopic rotors spinning about normally horizontal axes displaced at an angle to one another, a frame for each of said rotors, spaced air bearings pivotally mounting each frame about a vertical axis in said support, means for oppositely connecting said frames, gravity reference means carried by each of said frames for detecting tilt of the rotors from a horizontal plane, and means for applying a torque about the vertical axis of each frame responsive to the respective reference means on the frames to maintain the spin axes of the rotors horizontal.

9. Means for levelling the sensitive element of a twin rotor frame type of zenith meridian indicator in which the spin axes of the rotors are at a substantial angle to one another, comprising pendulous means on the respective frames for detecting tilt of the spin axis of the rotors from a horizontal plane, and means for applying a torque about the vertical axis of the respective frames responsive to the relative tilt of the respective pendulous means on the frames.

10. In a gyroscopic zenith meridian indicator with a sensitive element of the interconnected twin gyro rotor frame type, in which the spin axes of the rotors are at a substantial angle to one another, means for levelling the sensitive element of the instrument about its East-West axis comprising air blast means carried by each of the rotor frames providing normally balanced torques about the vertical axis of the sensitive element, and a pendulum mounted on each of the rotor frames both of which are effective with tilt of the sensitive element about the East-West axis to unbalance said air blast means and cause the same to exert a resultant levelling torque about the vertical axis of the sensitive element.

11. In a gyroscopic zenith meridian indicator with a sensitive element having interconnected twin gyro rotor frames mounted for movement about parallel vertical axes, in which the spin axes of the rotors are at a substantial angle to one another, means for levelling the sensitve element of the instrument about its North-South axis comprising air blast means carried by the rotor frames providing normally balanced torques about the respective vertical axes thereof, and a pendulum mounted on each of the rotor frames effective with tilt of the sensitive element about the North-South axis to unbalance said air blast means and thereby exert a resultant levelling torque about the vertical axes of the rotor frames.

12. In a gyro magnetic compass, a gyro unit comprising at least two gyro rotors having rotor bearing frames, a platform mounted for freedom about a vertical axis, means journaling said frames in said platform for freedom about spaced vertical axes, mechanical means interconnecting said frames to maintain the spin axes at an angle to one another, resilient centralizing means between said frames, a magnetic compass reference, and means responsive to relative change of the position of said platform in the earth's magnetic field for applying a torque about one of the horizontal axes of said platform.

FREDERICK D. BRADDON.

REFERENCES CITED

The following references are of record in the file of this patent:

UNITED STATES PATENTS

| Number | Name | Date |
|---|---|---|
| 1,186,339 | Schuler | June 6, 1916 |
| 1,548,442 | Chessin | Aug. 4, 1925 |
| 1,735,058 | Schuler | Nov. 12, 1929 |
| 1,801,619 | Arrea | Apr. 21, 1931 |
| 1,895,628 | Anschutz-Kaempfe | Jan. 31, 1935 |
| 2,015,650 | Bates | Oct. 1, 1935 |
| 2,046,998 | Boykow | July 7, 1936 |
| 2,263,232 | Bolster | Nov. 18, 1941 |
| 2,357,319 | Esval et al. | Sept. 5, 1944 |
| 2,383,460 | Purves et al. | Aug. 28, 1945 |

FOREIGN PATENTS

| Number | Country | Date |
|---|---|---|
| 837,639 | France | Nov. 18, 1938 |